United States Patent
Chen et al.

(10) Patent No.: US 9,939,592 B2
(45) Date of Patent: Apr. 10, 2018

(54) MICRO SINGLE-FIBER BIDIRECTIONAL OPTICAL TRANSCEIVER MODULE OF THE SAME WAVELENGTH

(71) Applicant: XUZHOU XUHAI OPTO-ELECTRONIC TECHNOLOGIES CO., LTD., Xuzhou (CN)

(72) Inventors: Bo Chen, Xuzhou (CN); Guangzhi He, Xuzhou (CN); Xiangxiang Pang, Xuzhou (CN)

(73) Assignee: XUZHOU XUHAI OPTO-ELECTRONIC TECHNOLOGIES CO., LTD., Xuzhou (CN)

( * ) Notice: Subject to any disclaimer, the term of this patent is extended or adjusted under 35 U.S.C. 154(b) by 0 days.

(21) Appl. No.: 15/514,808

(22) PCT Filed: Apr. 20, 2015

(86) PCT No.: PCT/CN2015/076936
§ 371 (c)(1),
(2) Date: May 5, 2017

(87) PCT Pub. No.: WO2016/065865
PCT Pub. Date: May 6, 2016

(65) Prior Publication Data
US 2017/0242206 A1 Aug. 24, 2017

(30) Foreign Application Priority Data

Oct. 27, 2014 (CN) .......................... 2014 1 0604190

(51) Int. Cl.
*G02B 6/28* (2006.01)
*G02B 6/42* (2006.01)
(Continued)

(52) U.S. Cl.
CPC ......... *G02B 6/4213* (2013.01); *G02B 5/1809* (2013.01); *G02B 6/2706* (2013.01);
(Continued)

(58) Field of Classification Search
CPC .. G02B 6/4213; G02B 6/2706; G02B 6/2766; G02B 6/2773; G02B 6/4246; G02B 5/1809; G02B 27/4261; G02F 1/09
(Continued)

(56) References Cited

U.S. PATENT DOCUMENTS 6,327,019 B1 * 12/2001 Patel ..................... G02B 6/272
349/196
7,039,278 B1 * 5/2006 Huang ................. G02B 6/2746
359/484.05
(Continued)

*Primary Examiner* — Jerry Blevins
(74) *Attorney, Agent, or Firm* — CBM Patent Consulting, LLC

(57) ABSTRACT

A single-fiber bidirectional optical transceiver module of the same wavelength. A sub-wavelength grating and a Faraday rotator are used, and the same element is reused to implement a polarization multiplex/de-multiplex function, so as to implement transmission and receiving of an optical signal in a small space. The single-fiber bidirectional optical transceiver module has less optical elements, a compact structure, and low cost, meeting the needs on a miniaturized, integrated, and high speed optical transceiver module for a modern optical communication system.

19 Claims, 12 Drawing Sheets

(51) Int. Cl.
*G02B 6/27* (2006.01)
*G02F 1/09* (2006.01)
*G02B 5/18* (2006.01)
*G02B 27/42* (2006.01)

(52) U.S. Cl.
CPC ......... *G02B 6/2766* (2013.01); *G02B 6/2773* (2013.01); *G02B 6/4246* (2013.01); *G02B 27/4261* (2013.01); *G02F 1/09* (2013.01)

(58) Field of Classification Search
USPC .......................................................... 385/24
See application file for complete search history.

(56) References Cited

U.S. PATENT DOCUMENTS

| | | | | |
|---|---|---|---|---|
| 2007/0196057 A1* | 8/2007 | Suzuki | ................ | G02B 6/4204 385/88 |
| 2013/0314784 A1* | 11/2013 | Fattal | ................... | G02B 5/1809 359/484.04 |

\* cited by examiner (1)　　　(2)　　(3)

(1)　　　(2)　　(3)

MICRO SINGLE-FIBER BIDIRECTIONAL OPTICAL TRANSCEIVER MODULE OF THE SAME WAVELENGTH

This application is the U.S. national phase of International Application No. PCT/CN2015/076936 filed on 20 Apr. 2015 which designated the U.S. and claims priority to Chinese Application Nos. CN201410604190.8 on 27 Oct. 2014, the entire contents of each of which are hereby incorporated by reference.

TECHNICAL FIELD

The present invention relates to an optical transceiver module of using an optical fiber for bidirectional optical signal transmission, and more particularly to the use of same wavelength and wavelength group with no need for the optical transceiver module to be paired on wavelength for single-fiber bidirectional transmission, having the feature of structure miniaturization.

BACKGROUND OF THE INVENTION

High-speed data transmission is the foundation of modern information society, the requirement of the data capacity that transmits in a fiber gets bigger and bigger with the massive growth of the amount of information. In addition to increasing modulation rate and using more wavelengths, bidirectional transmission in one optical fiber, which use the bidirectional optical transceiver module with low cost, can double the data transmission capacity in one fiber, this is an effective and adopted method in the optical communication industry.

In addition, the accuracy requirement of clock synchronization for modern communication network increase highly. The traditional optical transceiver module transmits and receives the optical signals by using two optical fibers, respectively, the length of the two optical fibers in the practical application will cause the propagation delay of the two signals inconformity, which causes huge difficulty to the clock synchronization. The use of single optical fiber bidirectional transmission can meet the accuracy requirement of the clock synchronization.

The generally adopted single-fiber bidirectional optical transceiver module scheme is as shown in FIG. 1. The transmission and receiving modules of the optical transceiver modules (102) and (103) have different configuration, such as the transmitting wavelength of the optical transceiver module (102) is λ1, and the receiving wavelength is λ2; the transmitting wavelength of the optical transceiver module (103) is λ2, and the receiving wavelength is 1. The wavelength filters (104) and (105) in the optical transceiver modules (102) and (103) have different optical filter properties, such as the wavelength filter (104) transmits λ1, and reflects λ2; wavelength filter (105) transmits λ2, and reflects λ1.

It can be seen that the single-fiber bidirectional transmission with dual-wavelength scheme in the existing technology shown in FIG. 1 needs to prepare two different types of optical transceiver module to be paired in the practical application. This is not only increase the inventory pressure, but also increase a certain difficulty in field deployment. Besides, due to the effect of the dispersion, the two different wavelengths also have a certain delay inequality even being transmitted in the same optical fiber, which can not meet the demand for high accuracy of clock synchronization in the application scenario.

Using the same wavelength in the bidirectional transmission of the same optical fiber is the way to solve the problems. In the existing technical solution as shown in FIG. 2 (Chinese Patent Application No. 201110282629.6), the transmitting and receiving of the optical transceiver modules (202) and (203) of the optical fiber ends adopt the same wavelength λ, and use the beam splitters (204) and (205) to replace the wavelength filter in scheme 1. The function of the beam splitter is partially reflecting and partially transmitting the optical signal that incident on it, the splitting ratio is usually 50% to 50%. The redundant reflected light generated by the beam splitter (204) and (205) is absorbed by the black light absorption body (206) and (207), which can avoid the crosstalk to the system. Thus, the optical transceiver module (202) and (203) of the optical fiber ends are the same, and no need to be paired.

The existing technology shown in FIG. 2 has a significant deficiency, that is the beam splitter (204) and (205) can produce a total of 6 dB link loss. And in many applications, the extra 6 dB loss is unacceptable.

To avoid the extra loss problem of the technical solution shown in FIG. 2, Chinese Patent Application 201110373606.6 disclosures a technical solution, as shown in FIG. 3. The technical solution adopts a set of optical elements (303) to (310), which enable the transmitting and receiving of the same wavelength. Specifically, the optical signal inputted to the input/output end (302) of the optical transceiver module (300) transmitted from the optical fiber (301) usually contains the first and the second polarization-states (using "|" and "•"), after passing through the first polarization beam splitter (303), two polarization-states separates; the optical signal of the first polarization-state arrives at the optical receiver (312) after passing through the Faraday rotator (305), half wave plate (307), the second polarization beam splitter (308), half wave plate (309) and the third polarization beam splitter (310); and the optical signal of the second polarization-state arrives at the optical receiver (312) after passing through the mirror (304) and the third polarization beam splitter (310).

The optical signal emitted from the optical transmitter (311) is with the first polarization-state ("|"), which arrives at the input/output end (302) after passing though the second polarization beam splitter (308), half wave plate (307), Faraday rotator (305) and the first polarization beam splitter (303).

Magnetic ring provides the magnetic field required by the Faraday rotator (305).

The technical solution shown in FIG. 3 enable the single-fiber bidirectional transmission of the same wavelength, which avoids the excessive power loss. However, the technical solution adopts overmuch optical element, which increases the cost; and two polarization-state transmission paths have larger separation in space, which also causes the volume difficult to further reducing. U.S. Pat. No. 7,039,278B1) also discourses the similar structure in scheme as shown in FIG. 3, which has the same problems of the volume and cost.

U.S. Pat. No. 7,039,278B1) further discourses a relatively compact structure, as shown in FIG. 4. The inputted optical signal of the transceiver module's (400) input/output end (401) incident on the first polarization beam splitter (403) after collimating by the first collimating lens (402), and disintegrating into the first polarization-state optical signal and the second polarization-state optical signal that are perpendicular to each other, and the second polarization-state optical signal is reflected by the second polarization beam splitter (403), and then reflected by the group of a ¼ wave plate (404) and a mirror (405), and the polarization-state rotates 90-degree, transmitting through the first polarization beam splitter (403), and passing through the second collimating lens (406), converging and getting to the optical detector (407), and receiving it.

The disintegrated first polarization-state optical signal by the first polarization beam splitter (403) transmitting through the first polarization beam splitter (403) rotates 90-degree after passing through the ½ wave plate (408) and the Faraday rotator (409), and reflected to the mirror (411) on the second polarization beam splitter (410), which reflected by the mirror (411) and the second polarization beam splitter (410) again, passing the Faraday rotator (409) and the ½ wave plate (408) in reverse direction, for the non-reciprocity of the Faraday rotator (409), the returned optical signal is perpendicular to the polarization-state of the first polarization-state optical signal, thus reflected by the first polarization beam splitter (403), and through the second collimating lens (406), converging and getting to the optical detector (407), and receiving it.

The outputted optical signal emitted form the laser chip (413) has the single polarization-state, after becoming the collimated beam through the third collimating lens (412), transmitting through the second polarization beam splitter (410), and through the Faraday rotator (409) and ½ wave plate (408), the polarization-state keeps the same, and further transmitting through the second polarization beam splitter (403), outputting to the input/output end that focuses through the first collimating lens (402).

The above scheme still uses a plurality of optical elements, causing big volume and high cost, and assembly difficulty. Furthermore, compared with the second polarization-state optical signal, the first polarization-state optical signal propagate back and forth through the second polarization beam splitter twice more, and the time of getting to the optical detector (407) has difference, causing a great polarization mode dispersion. The polarization mode dispersion depends on the size and refractive index of the second polarization beam splitter, if the refractive index is 1.5, even with the smallest size of 1 mm, the generated polarization mode dispersion will be about 10 ps, which is not suitable for high speed signal receiving (more than 10 G).

US Patent Application US20140054657, US20080042050 and the above U.S. Pat. No. 7,039,278B1 also revealed using a pair of birefringent crystals, inserting half wave plate and a Faraday rotator in the middle to separate the transmitting and receiving channels, however, the basic limitation is the distance of the transmitting and receiving channels is in direct proportion to the length of the birefringent crystals, to make the position of the transmitting and receiving channels having enough separation, the length of the optical element is close to 10 mm.

U.S. Pat. No. 7,039,278B1 also revealed using a pair of birefringent crystals wedge, adding the Faraday rotator in the middle, which can separate the transmitting and receiving channels in the form of angle separation, and use an optical lens to transform the angle separation into the location separation for the transmitting laser and optical detector. However, the scheme needs integrated transmitting and receiving chip, the process isn't easy to realize and the cost is high. Besides, the transmitting and receiving chip are too close, the reflected light from the lens surface, which is originally emitted from the transmitting laser chip, can easily get into the optical detector; for the power of optical signal emitted from the transmitting laser chip is very high, so even a small reflection will produce unacceptable crosstalk to the receiving end.

In conclusion, the existing single-fiber bidirectional transmission solution with the same wavelength has the lack of performance, size, and cost more or less, therefore, a new technology of low cost without larger crosstalk and loss, and small sized single-fiber bidirectional optical transceiver module with the same wavelength is needed. Particularly, if the geometric structure and size provided by the new technology is compatible with the existing technology shown in FIG. 1, which can maximally use the existing platform, significantly lower the cost, and share the simple and convenient of communication system bring by the technology of single-fiber bidirectional with dual-wavelength.

SUMMARY

To meet the needs of integration and miniaturization of optical communication devices, the present invention provides a single-fiber bidirectional optical transceiver module of the same wavelength and a single-fiber bidirectional optical transceiver module of the same wavelength group in low cost and compact structure.

It can be seen that the use of a plurality of birefringent crystals or a plurality of multilayer thin-film polarization beam splitters based solution has the limitation of size and cost, which cannot be further reduced according to the analysis of above. The single-fiber bidirectional optical transceiver module of the same wavelength provided by present invention adopts the polarization reflector based on sub-wavelength grating structure, which makes the depletion in numbers of the optical elements required, the optical structure is simplified greatly and the cost is reduced at the same time. The essential feature of the sub-wavelength grating is that the grating period is less than one wavelength, only zero order diffraction light exists, combining with its sensitivity to polarization, sub-wavelength greating enable its function of reflecting light of onepolarization state and transmitting to another perpendicular polarization state.

Document J.Opt.12(2010)015703 reported a type of sub-wavelength dielectric grating whose substrate (501) are made of silicon dioxide, as shown in FIG. 5a, and the material of the grating (502) is silicon, the optical signal (504) that incidents on the grating contains two polarization-states that are perpendicular to each other (TE mode and TM mode for grating). A grating period has a sub structure, TE mode (505) can reflect and TM mode (506) can transmit by optimizing the design of the grating period T and the sub structure's airspace (503a and 503b).

Another kind of sub-wavelength grating is the sub-wavelength metal grating, which adopts the metal wire as the grating material, as shown in FIG. 5b, the substrate (507) is made of optical glass materials, such as silicon dioxide, BK7 (or other optical glass), with the metal wire grating on it, the metal can be gold, silver, copper, aluminum and so on. The inner of a period T of the grating is made of the metal wire (508) and the filling material (509), the grating period T is less than one wavelength. The optical signal (510) that incident on the grating contains two polarization-states that are perpendicular to each other (TE mode and TM mode for grating). The optical field incident to the metal wire activate surface plasmon polaritonson the metal surface, due to the long and narrow features of the metal wire, the behavior of the surface plasmon polaritons on the grating direction is different with that of another direction, which makes the TE mode (511) reflection and TM mode (512) transmission.

Usually, the two surfaces of the sub-wavelength grating (containing the substrate) are coated with multilayer optical dielectric films, which reduce the Fresnel reflection of the interface, and improve the polarization extinction ratio.

The present invention uses above sub-wavelength grating's polarization property, combining the nonreciprocal property of the Faraday rotator, and multiplexing a polarization beam splitter/combiner, thus enable the miniaturization and low cost of the single-fiber bidirectional optical transceiver module of the same wavelength.

As shown in FIG. 6, the optical transceiver module (600) provided in the present invention, comprising:

1. an input/output end (601), configured to input and output an optical signal;
2. a polarization beam splitter/combiner (602);
3. a first polarization reflector (603);
4. a second polarization reflector (604);
5. at least one optical signal transmitting unit (605);
6. an optical signal receiving unit (606).

The input/output end (601) receives an incident optical signal comprising at least one wavelength, and couples the received incident optical signal into the polarization beam splitter/combiner (602), the polarization beam splitter/combiner disintegrates the incident optical signal into a first polarization-state optical signal (607) and a second polarization-state optical signal (608) that are perpendicular to each other, which can make the first polarization-state optical signal transmission and the second polarization-state optical signal reflection come true.

The at least one optical signal transmitting unit (605), generally it's a modulated laser or its array, and the emitted optical signal called transmitting optical signal, which has one wavelength at least, providing with single polarization-state.

The first and second polarization reflectors make the first and second polarization-state optical signal reflection and change the polarization-state to the perpendicular polarization state, becoming the third polarization-state optical signal (609) and the fourth polarization-state optical signal (610). The third polarization-state optical signal and the fourth polarization-state optical signal are reflected and transmitted by the polarization beam splitter/combiner (602) again, reaching the optical signal receiving unit (606).

To illustrate conveniently, linear polarization-state will be used in FIG. 6 and the followings, "|" and "•" will be expressed as the polarization directions of the first and the second polarization-state optical signals. The polarization directions of the first and the second polarization-state optical signals can be exchanged without departing from the spirit of the present invention.

FIG. 7a and FIG. 7b shows that the first and the second polarization reflectors can have two formations.

The polarization reflector shown in FIG. 7a is formed of a ¼ wave plate (702) and a mirror (703). The optical axis of the ¼ wave plate meets the polarization direction of the incident optical signal at 45-degree angles. The incident optical signal (704) becomes the optical signal (705) that its polarization-state rotates 90-degree after passing the ¼ wave plate and reflected by the mirror, and passing the ¼ wave plate again. ¼ wave plate (702) in FIG. 7a can further replaced by the 45-degree Faraday rotator, and the optical signal's polarization direction rotates 90-degree after passing through the 45-degree Faraday rotator twice.

The polarization reflector shown in FIG. 7b is made of a 45-degree Faraday rotator (707) and a sub-wavelength optical grating polarization reflector (708). After the incident optical signal (709) passing through the 45-degree Faraday rotator, its polarization direction rotates 45-degree, and reflected by the sub-wave optical grating polarization reflector (708), then pass through the 45-degree Faraday rotator again where the polarization direction shall rotate 45-degree along the same direction, becoming the optical signal (710) that its polarization-state rotates 90-degree in total. Besides the reflection for a certain polarization-state, the sub-wavelength grating polarization reflector (708) can also transmit the perpendicular polarization-state. Generally, the incident optical signal (709) and transmitting optical signal (711) emitted from the optical signal transmitting unit are taken to incident from two sides of sub-wavelength grating polarization reflector (708), respectively, one reflects, one transmits. The arrangement of the polarization-state, location and angle of the transmitting optical signal (711) makes it passing through the sub-wavelength grating polarization reflector (708), becoming the transmitting optical signal (712) having the opposite direction, same location and consistent polarization-state with the incident optical signal (709), which can propagate to the input/output end in reverse direction according to the principle of optical path reversibility.

At least one of the first and the second polarization reflectors is formed of the combination shown in FIG. 7b, allowing at least one optical transmitting unit's transmitting optical signal to transmit through the first or the second polarization reflector. The sub-wavelength optical grating polarization reflector (708) in FIG. 7b can be one of the sub-wavelength dielectric grating, sub-wavelength metal grating or sub-wavelength dielectric and metal mixed grating.

Back to FIG. 6, and combine with FIG. 8a and FIG. 8b, how the transmitting optical signal of the optical transmitting unit will couple to the input/output end (601) will be further described. To illustrate conveniently, the first polarization reflector in FIG. 6 uses the structure in FIG. 7b, and the second polarization reflector uses the structure in FIG. 7a. The subgraph (1) of FIG. 8a shows the polarization direction of the first polarization-state optical signal (607) before incidents on the first polarization reflector; the subgraph (2) of FIG. 8a shows the polarization direction of the first polarization-state optical signal (607) after passing through the 45-degree Faraday rotator in the first polarization reflector, compared with the subgraph (1) of FIG. 8a, the polarization direction shown in subgraph (2) of FIG. 8a rotates 45-degree clockwise (also can be counterclockwise rotation); the subgraph (3) of FIG. 8a shows that the first polarization-state optical signal's polarization direction after being reflected by the first polarization reflector (through the 45-degree Faraday rotator twice), which is perpendicular to the polarization direction before incident.

The subgraph (1) of FIG. 8b shows the polarization direction of the transmitting optical signal from the optical signal transmitting unit before incidents on the first polarization reflector, compared with the subgraph (1) of FIG. 8a, the direction rotates 45-degree counterclockwise; after transmitting through the sub-wavelength optical polarization reflector, as shown in subgraph (2) of FIG. 8b, the polarization-state stays the same; and further through the 45-degree Faraday rotator, as shown in subgraph (3) of FIG. 8b, the polarization direction is the same with the polarization direction of the first polarization-state optical signal before incidents on the first polarization reflector. Back to FIG. 6, the transmitting optical signal (611) emitted from the optical signal transmitting unit becomes the transmitting optical signal (612) having the consistent polarization direction with the first polarization-state optical signal after passing through the first polarization reflector (603), and as mentioned above, the arrangement of its angle and location makes its in opposite direction and overlapped locations with that of the first polarization-state optical signal, thus further transmit through the polarization beam splitter/combiner (602), and couple to the input/output end (601).

It can be seen that the polarization beam splitter/combiner (602) have the effect of polarization beam splitting and polarization beam combining, the transmitting optical signal couples to the input/output end through the exceedingly compact optical path in combination with the first or the second polarization reflector of FIG. 7b. In the process of actual implementation, the distance from the optical signal transmitting unit to the input/output end only needs 1 to 2 mm, which enables the miniaturization of the single-fiber bidirectional optical transceiver module of the same wavelength.

The polarization beam splitter/combiner (602) can also uses the two forms shown in FIG. 9a and FIG. 9b. FIG. 9a shows the use of polarization beam splitter/combiner of a multi-layer dielectric thin film type (901), FIG. 9b shows the use of sub-wavelength grating polarization beam splitter/combiner (908) type. The incident optical signal (902) contains two polarization-states that are perpendicular to each other, transmitting and reflecting by the polarization beam splitter/combiner, respectively, becoming the optical signals (903 and 904) propagated along the transmission path and the reflection path, after being reflected by the first and the second polarization reflectors, the polarization-states change to the optical signals (906 and 905) perpendicular to the original polarization-state, reflecting and transmitting by the polarization beam splitter/combiner (901 and 908), respectively, and combining into the optical signal (907) in the same direction.

The optical signal's receiving and transmitting unit can be of single wavelength or multi-wavelength.

When the transmission wavelength is single, as shown in FIG. 10, the optical signal receiving unit is a single optical detector (1008); the optical signal transmitting unit is a single modulated laser (1007); while the transmitting optical signal is made of the single wavelength transmitted by the single modulated laser. The FIG. 1004) is the combination of the polarization beam splitter/combiner and the first and the second polarization reflectors.

When the transmission wavelengths are multi-wavelength, adopting the structure shown in FIG. 11, the optical signal receiving unit (1108) is the combination of the wavelength de-multiplexer (1106) and optical detector array (1102); the multi-wavelength $\lambda_1, \lambda_2 \ldots \lambda_n$ of the incident optical signal propagated from the combination (1104) of the polarization beam splitter/combiner and the first and the second polarization reflectors are disintegrated into independent wavelength through the wavelength de-multiplexer (1106), inputting to each optical detector of the optical detector array (1102); the optical signal transmitting unit (1107) is the combination of the wavelength multiplexer (1105) and the modulated laser array (1101). Modulated lasers in the modulated laser array (1101) transmits the transmitting optical signal of $\lambda_1, \lambda_2 \ldots \lambda_n$, inputting to the wavelength multiplexer (1105) and combining it.

When the transmission wavelengths are multi-wavelength, it can also adopt the structure as shown in FIG. 12, which can use a wavelength multiplexer/de-multiplexer (1201). The incident optical signals $\lambda_1, \lambda_2 \ldots \lambda_n$ of multi-wavelength are disintegrated into independent wavelength by the wavelength multiplexer/de-multiplexer (1202), inputting to the polarization beam splitter/combiner (1202), disintegrating into two groups of optical signals that are perpendicular to each other, then being reflected by the following first and the second polarization reflectors (not shown), and being combined by the polarization beam splitter/combiner (1202), coupling to the optical detector array (1208) and being received; the optical signal transmitting unit is a modulated laser array (1207) which emit the optical signals of $\lambda_1, \lambda_2 \ldots \lambda_n$, which have the single polarization-state, passing the first or second polarization reflector (not shown), polarization beam splitter/combiner (1202) adversely, inputting to the wavelength multiplexer/de-multiplexer (1201), and outputting after being combining. It can be seen that the wavelength de-multiplexing and the multiplexing used the same element (1201), and the wavelength separation direction (1206) is perpendicular to the plane (1205) that made of transmission and reflection path of the polarization beam splitter/combiner.

The wavelength multiplexer, de-multiplexer, wavelength multiplexer/de-multiplexer can be one of the arrayed waveguide grating, the diffraction grating, the thin film filter group, or the cascading Mach-Zehnder interferometer.

The present invention further provides a single-fiber bidirectional optical transceiver module with two optical signal transmitting units, as shown in FIG. 13. The incident optical signal of the multi wavelengths $\lambda_1, \lambda_2 \ldots \lambda_n$ from the input/output end pass through the polarization beam splitter/combiner (1304) firstly, disintegrate into the first polarization-state optical signal and the second polarization-state optical signal that are perpendicular to each other, propagate through the transmission path and the reflection path, respectively, and be reflected by the first and the second polarization reflectors (1302, 1305), the polarization-state changes perpendicularly to the original polarization-state, and combined by the polarization beam splitter/combiner (1304), propagate to the optical signal receiving unit (1306) and be received. The optical signal emitted from the first optical signal transmitting unit (1301) is the first group of transmitting optical signal, the wavelengths are $\lambda_1, \lambda_3 \ldots \lambda_{n-1}$ and have the single polarization-state, which is consistent with the polarization-state of the first polarization-state optical signal on the transmission path of the transmitting optical signal after passing the first polarization reflector (1302), the default angle and location make the first group of transmitting optical signal couple to the input/output end after passing the polarization beam splitter/combiner (1304); the optical signal emitted from the second optical signal transmitting unit (1303) is the second group of transmitting optical signal, the wavelengths are $\lambda2, \lambda4 \ldots \lambda_n$ and have the single polarization-state, which is consistent with the polarization-state of the second polarization-state optical signal on the reflection path of the transmitting optical signal after passing the second polarization reflector (1305), the default angle and location make the second group of transmitting optical signal couple to the input/output end after passing the polarization beam splitter/combiner (1304).

A collimating lens can be further used in the practical coupling system, which can be located between the input/output end and the polarization beam splitter/combiner, or between the polarization beam splitter/combiner and the optical signal receiving or transmitting unit. The optical signal transmitting unit and the optical signal receiving unit can also contain the coupling lens.

Generally, the input/output end is in the form of fiber pigtail, the fiber pigtail end face tilted, which can prevent the back reflection of the input and output optical signal, the tilted angle is 6 to 8 degree.

The 45-degree Faraday rotator can rotate the polarization-state of propagating optical beam by 45-degree clockwise or counterclockwise, it's made of the material having Faraday effect, usually, a magnetic field is needed to maintain the effect, and the magnetic field can be provided by an external magnet, or provided by internal magnetic field within the material.

BRIEF DESCRIPTION OF THE DRAWINGS

FIG. 5a illustrates the sub-wavelength metal grating used by the sub-wavelength grating polarization reflector provided by the present invention

DETAILED DESCRIPTION OF THE EMBODIMENTS

Embodiment 1

Figure 14:
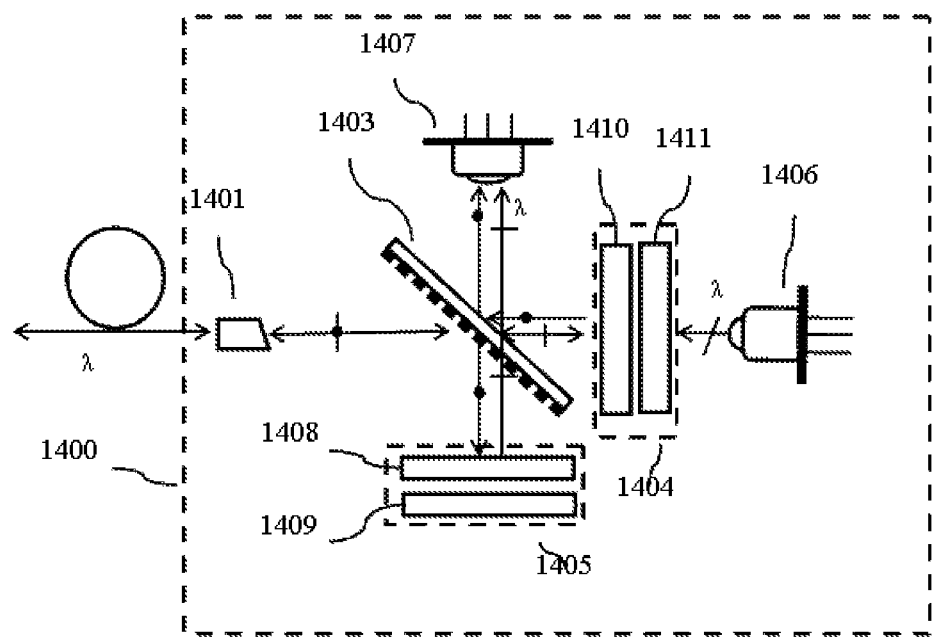
FIG. 14 illustrates Embodiment 1 of the miniaturized single-fiber bidirectional optical transceiver module of the same wavelength provided by the present invention

As shown in FIG. 14, one embodiment of the miniaturized single-fiber bidirectional optical transceiver module (1400) of the same wavelength provided by the present invention, comprising:

1. an input/output end (1401), configured to input and output an optical signal;
2. a sub-wavelength grating polarization beam splitter/combiner (1403);
3. a first polarization reflector (1404);
4. a second polarization reflector (1405);
5. an optical signal transmitting unit (1406);
6. an optical signal receiving unit (1407).

the input/output end (1401) receives an incident optical signal comprising one wave length, and inputs the received incident optical signal into the polarization beam splitter/combiner (1403) of sub-wavelength grating type; and dis-integrated into the first and the second polarization-state optical signal that are perpendicular to each other, which are respectively transmitted along a transmission path and a reflection path to the first and the second polarization reflector (1404, 1405).

The first polarization reflector is formed by a 45-degree Faraday rotator (1401) and a sub-wavelength metal grating (1411), receiving the first polarization-state optical signal from the polarization beam splitter/combiner (1403).

The second polarization reflector is formed by a ¼ wave plate (1408) and a mirror (1409), receiving the second polarization-state optical signal from the polarization beam splitter/combiner (1403). The optical axis of the ¼ wave plate meets the polarization direction of the incident optical signal at 45-degree angles, which from the reflection path of the polarization beam splitter/combiner (1403).

The first and the second polarization-state optical signals are reflected by the first and the second polarization reflector, the polarization direction rotates 90-degree respectively, propagating to the polarization beam splitter/combiner (1403) in reverse direction, reflecting and transmitting to the optical signal receiving unit (1407) and be received. The optical signal receiving unit (1407) is a coaxial packaging optical detector with convergent lens.

The optical signal transmission unit (1406) is a modulated laser with convergent lens, and the emitted transmitting optical signal has one wavelength, providing with a single polarization-state. The arrangement of the transmitting optical signal's direction, location and angle makes it pass the first polarization reflector (1404), which is consistent with the polarization-state of the first polarization-state optical signal on the transmission path of the transmitting optical signal, the location overlaps and the direction of propagation is in the opposite direction, which can further pass the polarization beam splitter/combiner (1403) and get to the input/output end (1401).

The input/output end is the end face of tilted pigtail, the angle of inclination is 6 to 8 degree.

Embodiment 2

Figure 15:
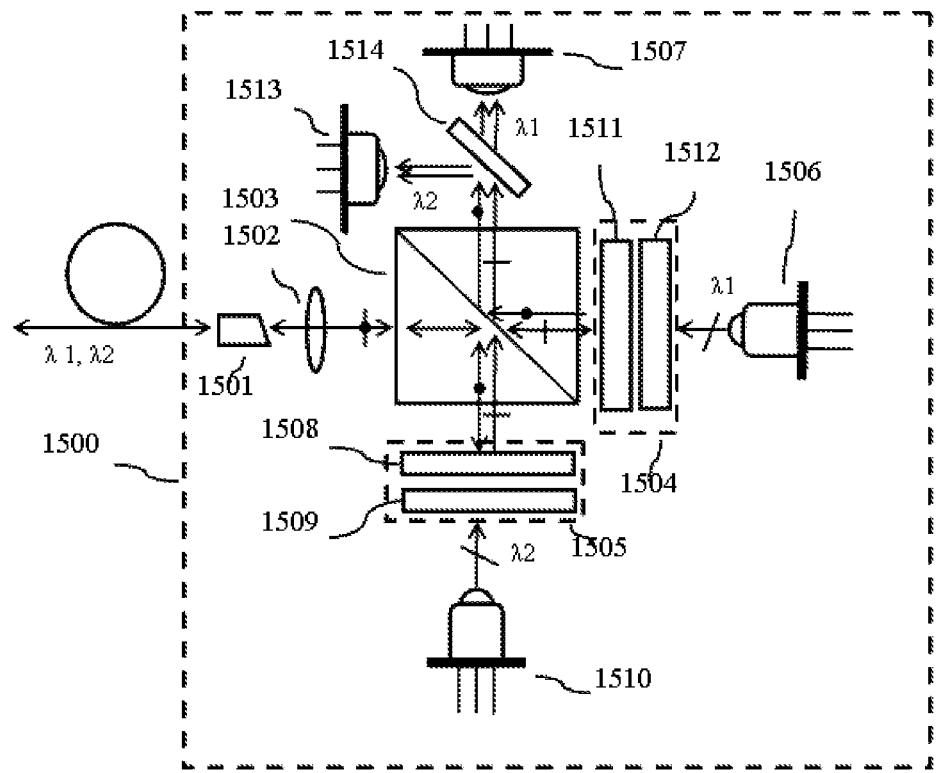
FIG. 15 illustrates Embodiment 2 of the miniaturized single-fiber bidirectional optical transceiver module of the same wavelength provided by the present invention

As shown in FIG. 15, one embodiment of the miniaturized single-fiber bidirectional optical transceiver module (1500) of the same wavelength provided by the present invention, comprising:

1. an input/output end (1501), configured to input and output an optical signal;
2. a collimating lens (1502);
3. a polarization beam splitter/combiner of a multi-layer dielectric thin film type (1503);
4. a first polarization reflector (1504);
5. a second polarization reflector (1505);
6. a first optical signal transmitting unit (1506) and a second optical signal transmitting unit (1510);
7. a first optical signal receiving unit (1507) and a second optical signal receiving unit (1513);
8. a wavelength filter of multi-layer dielectric thin film type (1514).

The input/output end (1501) receiving contains two incident optical signals of two wavelengths, the wavelengths are λ1 and λ2, and inputting the received incident optical signal to the polarization beam splitter/combiner (1503) of multi-layer dielectric thin film type after being collimated by the collimating lens (1502), and disintegrated into the first and the second polarization-state optical signal that are perpendicular to each other, which all contain the incident optical signals of λ1 and λ2, propagating from the transmission path and the reflection path, respectively.

The first and the second polarization reflectors (1504, 1505) have the same formation, which made of the 45-degree Faraday rotators (1511, 1508) and sub-wavelength metal gratings (1512, 1509).

The first and the second polarization-state optical signals propagate to the first and the second polarization reflector, after being reflected, the polarization direction each rotating 90-degree, propagating to the polarization beam splitter/combiner (1503) in reverse direction, reflecting and transmitting to the wavelength filter of multi-layer dielectric thin film type (1514), respectively, the incident optical signal with the wavelength of $\lambda_1$ is transmitted to the first optical signal receiving unit (1507) and be received, and the incident optical signal with the wavelength of λ2 is transmitted to the second optical signal receiving unit (1513).

The first and the second optical signal receiving units are the coaxial packaging optical detectors with convergent lens.

The present embodiment is provided with two optical signal transmitting units (1506) and (1510), which are modulated lasers with collimating lens, and the emitted optical signals are called the first transmitting optical signal and the second transmitting optical signal, and the wavelengths are $\lambda_1$ and $\lambda_2$ respectively. After the first transmitting optical signal and the second transmitting optical signal passing through the first and the second polarization reflectors (1504, 1505) in reverse direction, the polarization-states and locations of them are consistent with the polarization-state and location of the first polarization-state optical signal and the second polarization-state optical signal on the transmission and reflection path of the incident optical signal, respectively, thus transmitting and reflecting through the polarization beam splitter/combiner (1503), respectively, and passing the collimating lens (1502), focusing and getting to the input/output end (1501).

The input/output end is the end face of tilted pigtail, the angle of inclination is 6 to 8 degree.

Embodiment 3

Figure 16:
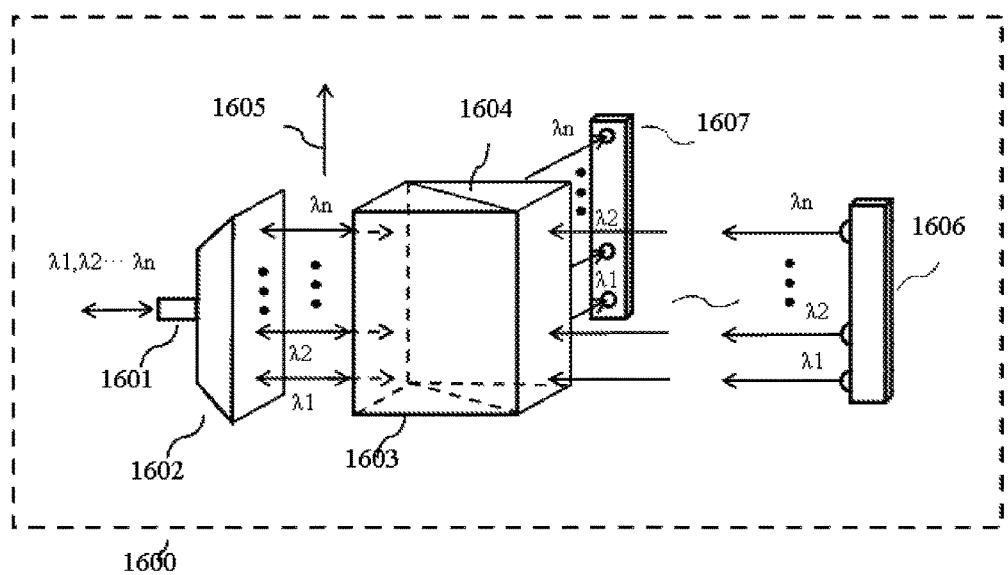
FIG. 16 illustrates Embodiment 3 of the miniaturized single-fiber bidirectional optical transceiver module of the same wavelength provided by the present invention

As shown in FIG. 16, one embodiment of the miniaturized single-fiber bidirectional optical transceiver module (1600) of the same wavelength provided by the present invention, comprising:

1. an input/output end (1601), configured to input and output an optical signal;
2. a wavelength multiplexer/de-multiplexer (1602);
3. a polarization beam splitter/combiner (1603);
4. a first polarization reflector;
5. a second polarization reflector;
6. an optical signal transmitting unit group (1606);
7. an optical signal receiving unit group (1607).

The input/output end (1601) receives the incident optical signal comprising multi wavelengths $\lambda_1, \lambda_2 \ldots \lambda_n$ and inputs to the wavelength multiplexer/de-multiplexer (1602), the incident optical signals with different wavelength are separated on the direction (1605) perpendicular to the plane (1604) that made of transmission and reflection path of the polarization beam splitter/combiner, which incidents on the polarization beam splitter/combiner (1603). The polarization beam splitter/combiner (1603) further disintegrates the incident optical signals with different wavelength into the first polarization-state optical signal group and the second polarization-state optical signal group that have location separated and perpendicular to each other, propagating from the transmission path and the reflection path, respectively.

The same as the embodiment 1, the first polarization reflector (not pictured) is formed by a 45-degree Faraday rotator and a sub-wavelength metal grating, receiving the first polarization-state optical signal group from the polarization beam splitter/combiner (1603).

The same as the embodiment 1, the second polarization reflector (not pictured) is formed by a ¼ wave plate and a mirror, receiving the second polarization-state optical signal group from the polarization beam splitter/combiner (1603). The optical axis of the ¼ wave plate meets the polarization direction of the incident optical signal at 45-degree angles, which from the reflection path of the polarization beam splitter/combiner (1603).

The first and the second polarization-state optical signal groups are reflected by the first and the second polarization reflector, the polarization direction rotates 90-degree respectively, propagating to the polarization beam splitter/combiner (1603) in reverse direction, reflecting and transmitting to the optical signal receiving unit group (1607) and be received. The optical signal receiving unit group (1607) is a coaxial packaging optical detector array with convergent lens array.

The optical signal transmitting unit group (1606) is made of the convergent lens array and the modulated laser array, the multi wavelengths $\lambda_1, \lambda_2 \ldots \lambda_n$ emitted from the modulated laser array have the single polarization-state, they pass through the convergent lens array, the first polarization reflector, the polarization beam splitter/combiner, then successively arrive at the wavelength multiplexer/de-multiplexer (1602), hereby, the combined wave of the transmitting optical signal with multi wavelengths inputs to the input/output end (1601).

Figure 1:
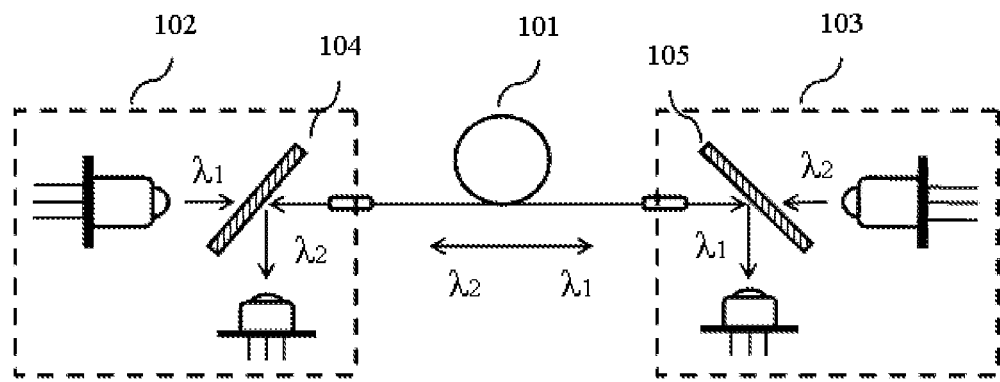
FIG. 1 is a schematic diagram of the existing dual wavelength single-fiber bidirectional optical transceiver module
Figure 2:
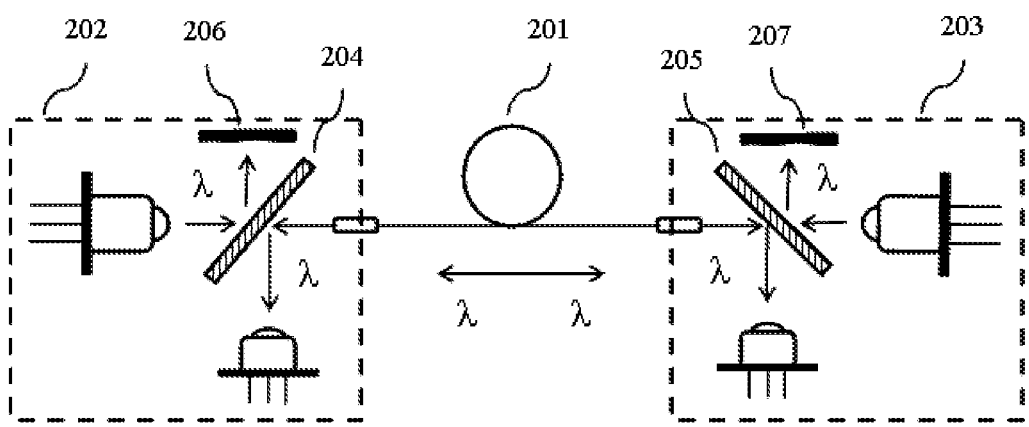
FIG. 2 is a schematic diagram of the existing single wavelength single-fiber bidirectional optical transceiver module
Figure 3:
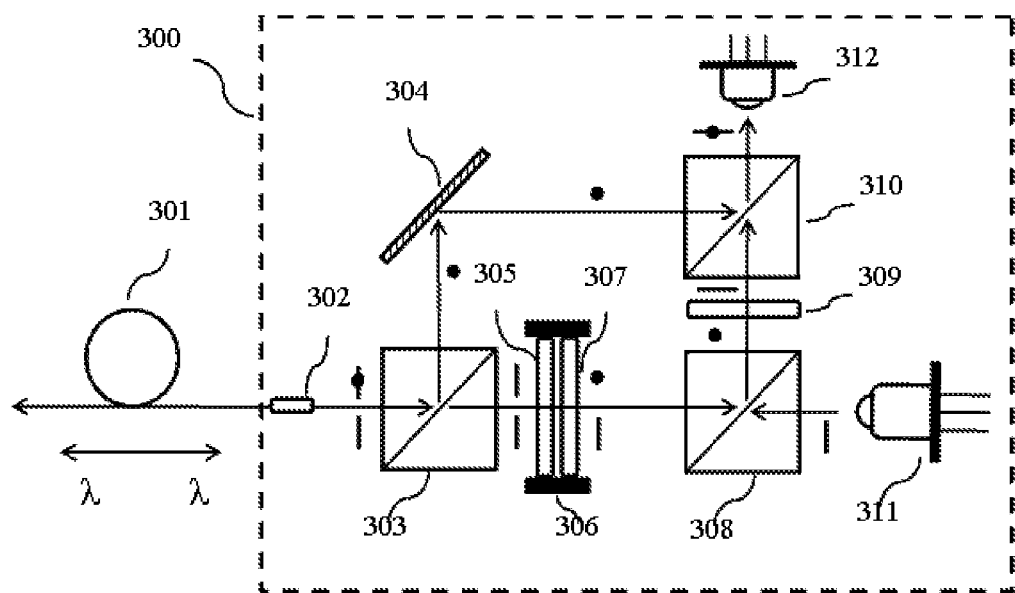
FIG. 3 is a schematic diagram of the existing single wavelength single-fiber bidirectional optical transceiver module
Figure 4:
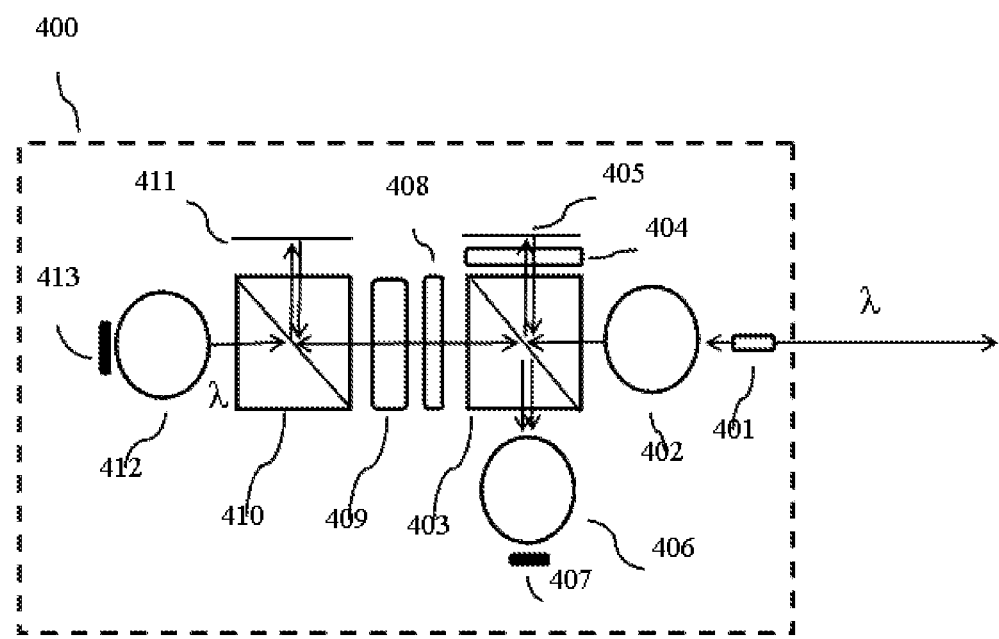
FIG. 4 is a schematic diagram of the existing single wavelength single-fiber bidirectional optical transceiver module
Figure 5A:
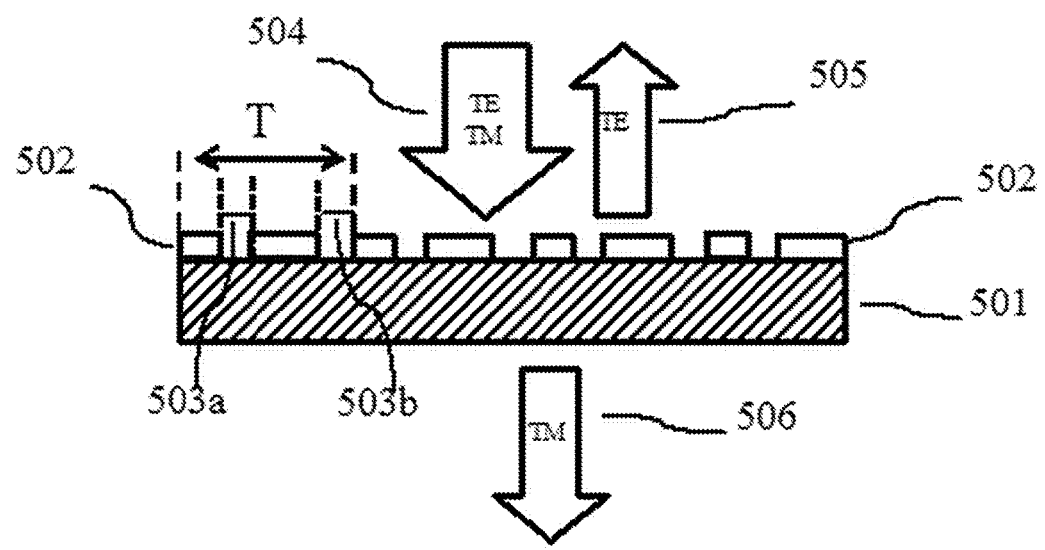
FIG. 5a illustrates the sub-wavelength dielectric grating used by the sub-wavelength grating polarization reflector according to the present invention
Figure 5B:
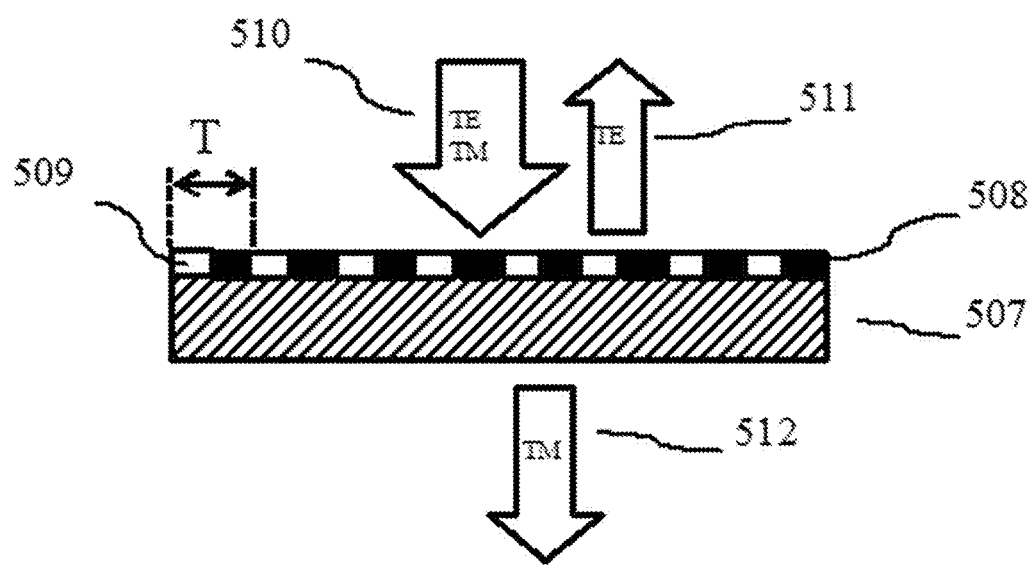
Figure 6:
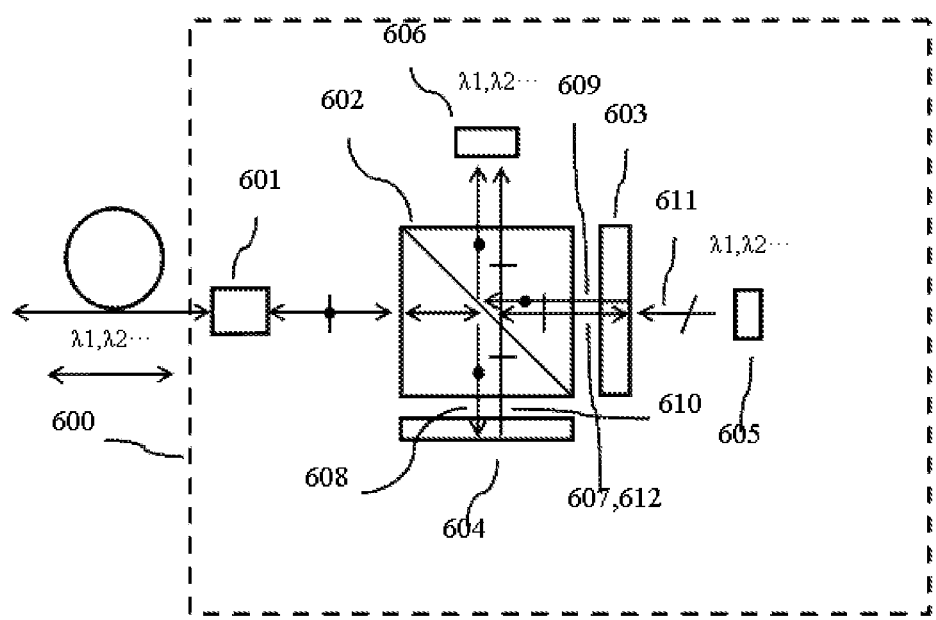
FIG. 6 is a schematic diagram of the miniaturized single-fiber bidirectional optical transceiver module of the same wavelength provided by the present invention
Figure 7A:
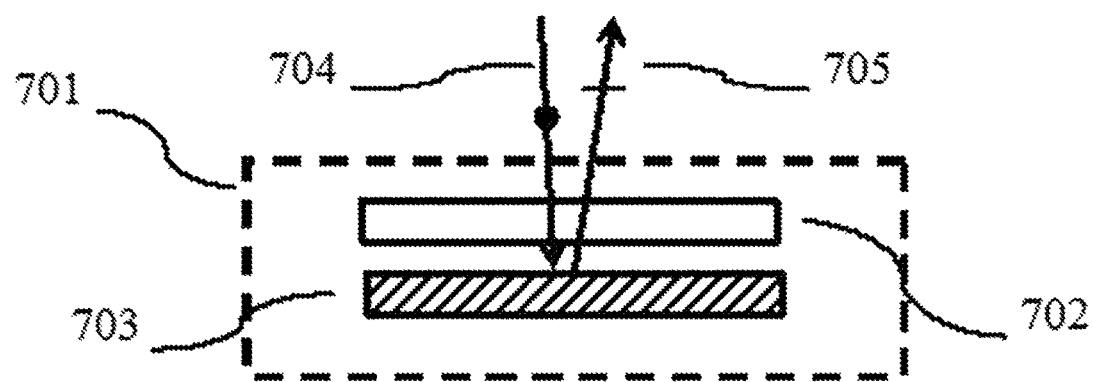
FIG. 7a illustrates the first form of the first or second polarization reflector provided by the present invention
Figure 7B:
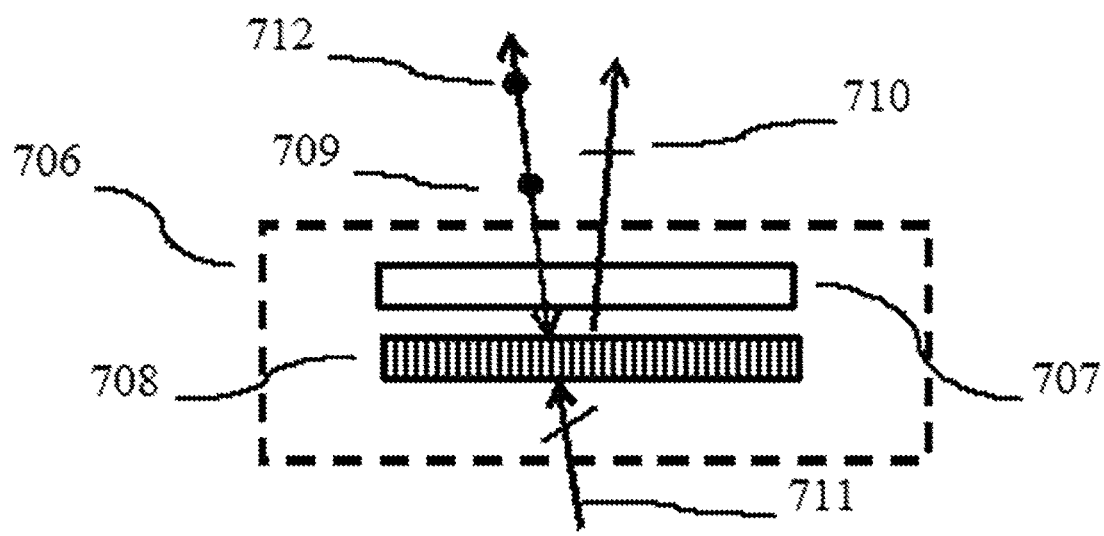
FIG. 7b illustrates the second form of the first or second polarization reflector provided by the present invention
Figure 8A:
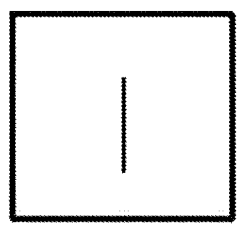
FIG. 8a illustrates the polarization states before and after the incident optical signal being reflected by the first or second polarization reflector provided by the present invention
Figure 8A:
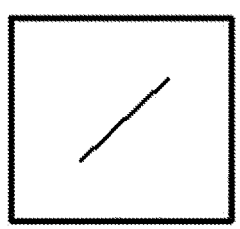
Figure 8A:
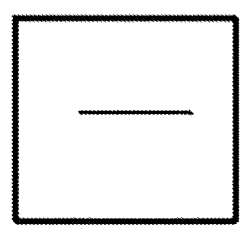
Figure 8B:
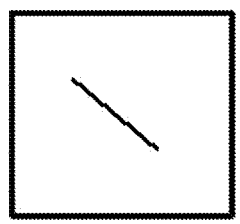
FIG. 8b illustrates the polarization states before and after the transmitting optical signal transmitting through the first or second polarization reflector provided by the present invention
Figure 8B:
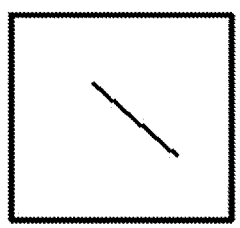
Figure 8B:
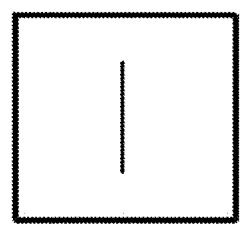
Figure 9A:
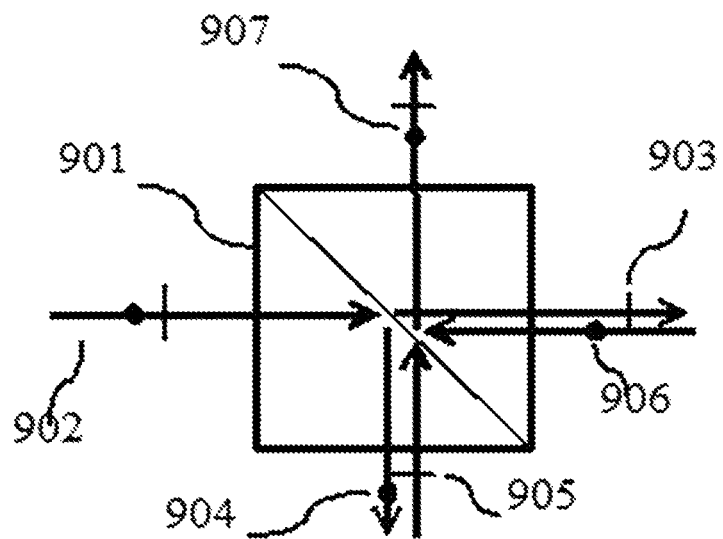
FIG. 9a illustrates the first type of the polarization beam splitter/combiner (multi-layer dielectric thin film) provided by the present invention
Figure 9B:
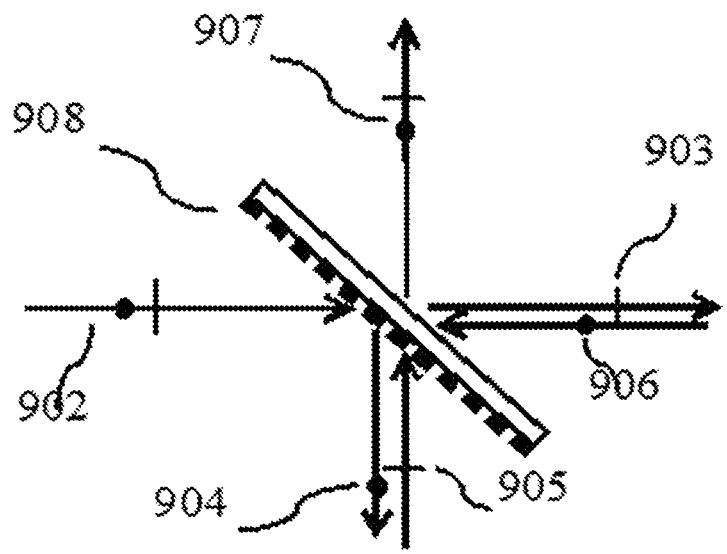
FIG. 9b illustrates the second type of the polarization beam splitter/combiner (sub-wavelength grating) provided by the present invention
Figure 10:
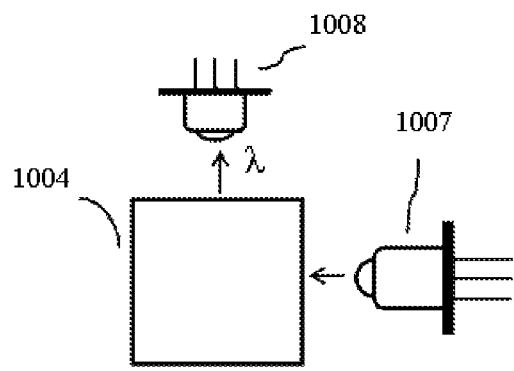
FIG. 10 illustrates the single-fiber bidirectional optical transceiver module of single wavelength provided by the present invention
Figure 11:
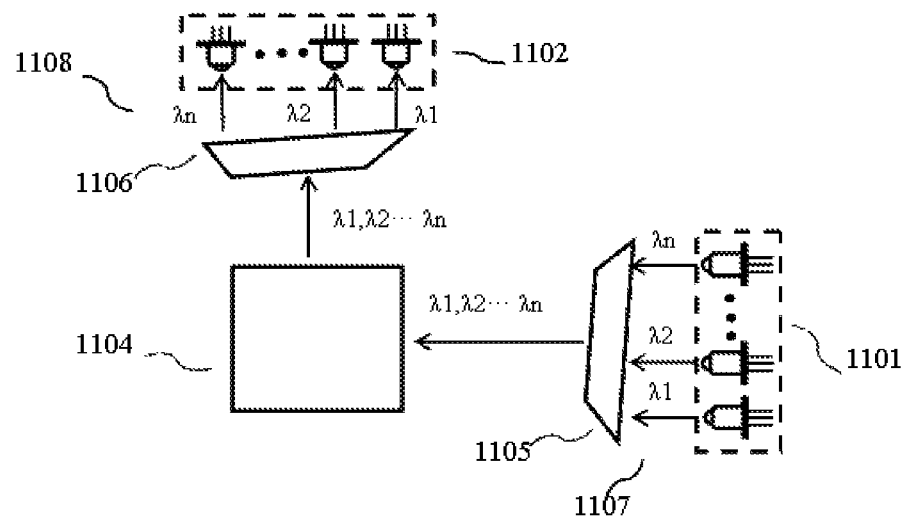
FIG. 11 illustrates the first type of the single-fiber bidirectional optical transceiver module of multi wavelength provided by the present invention
Figure 12:
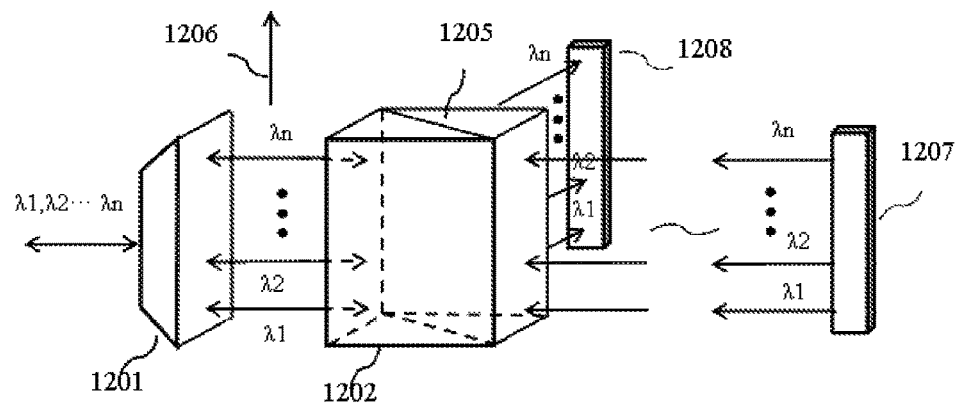
FIG. 12 illustrates the second type of the single-fiber bidirectional optical transceiver module of multi wavelength provided by the present invention, the receiving and the transmitting use the same element to achieve the multiplex/de-multiplex function
Figure 13:
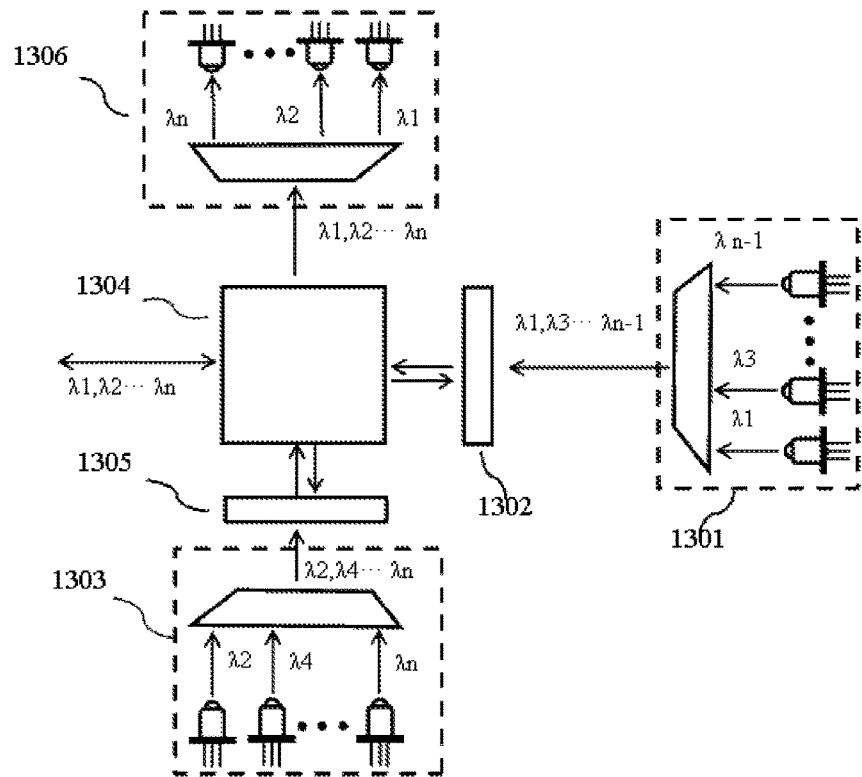
FIG. 13 illustrates the single-fiber bidirectional optical transceiver module of the same wavelength provided by the present invention has two groups of wavelength multiplexing

One preferred scheme of the wavelength multiplexer/de-multiplexer that adopted by this embodiment is based on the arrayed waveguide grating of the planar light circuit. The polarization beam splitter/combiner (1603) can be the multilayer dielectric thin film type shown in FIG. 9a or the sub-wavelength grating type shown in FIG. 9b.

The input/output end is the end face of the tilted pigtail, the angle of inclination is 6 to 8 degree.

Embodiment 4

Figure 17:
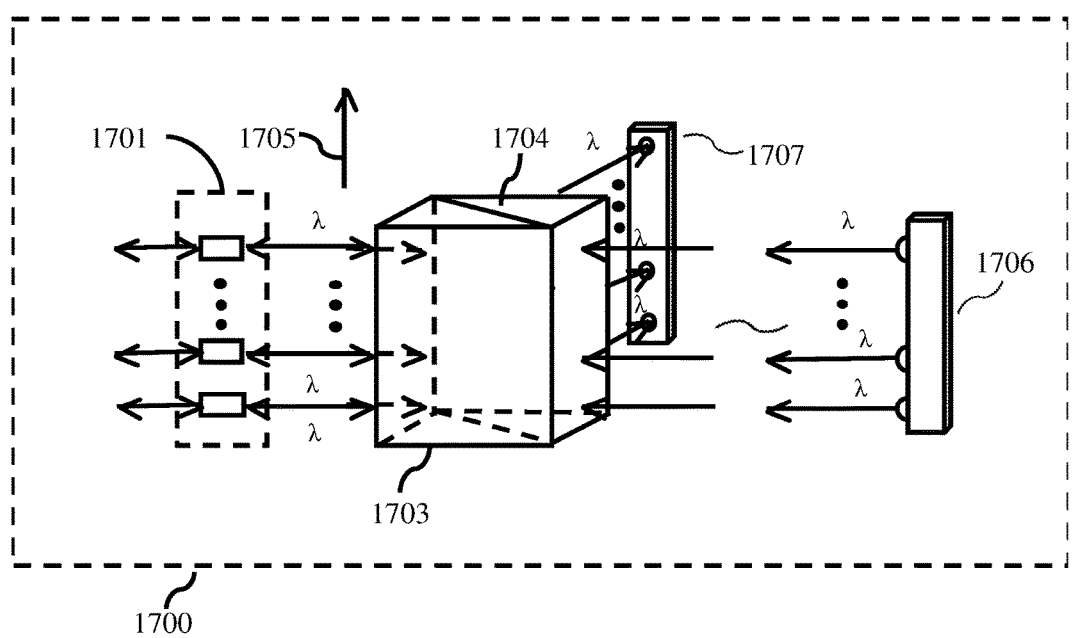
FIG. 17 illustrates Embodiment 4 of the miniaturized single-fiber bidirectional optical transceiver module of the same wavelength provided by the present invention

As shown in FIG. 17, one embodiment of the miniaturized single-fiber bidirectional optical transceiver module (1700) of the same wavelength provided by the present invention, comprising:
1. an input/output end of waveguide array type (1701), configured to input and output an optical signal;
2. a polarization beam splitter/combiner (1703);
3. a first polarization reflector;
4. a second polarization reflector;
5. an optical signal transmitting unit group (1706);
6. an optical signal receiving unit group (1707).

The input/output end of the optical waveguide array type (1701) receives multi-channel's incident optical signals, the wavelength of the multi-channel's incident optical signals can be the same or different, and inputs the multi-channel's incident optical signals to the polarization beam splitter/combiner (1703). The multi-channel's incident optical signals are arranged on the direction (1705) perpendicular to the plane (1704) that made of transmission and reflection path of the polarization beam splitter/combiner (1703). The polarization beam splitter/combiner (1703) further disintegrates the multi-channel's incident optical signals into the first polarization-state optical signal group and the second polarization-state optical signal group that are perpendicular to each other, propagating from the transmission path and the reflection path, respectively.

The same as the embodiment 1, the first polarization reflector (not pictured) is formed by a 45-degree Faraday rotator and a sub-wavelength metal grating, receiving the first polarization-state optical signal group from the polarization beam splitter/combiner (1703).

The same as the embodiment 1, the second polarization reflector (not pictured) is formed by a ¼ wave plate and a mirror, receiving the second polarization-state optical signal group from the polarization beam splitter/combiner (1703). The optical axis of the ¼ wave plate meets the polarization direction of the incident optical signal at 45-degree angles, which from the reflection path of the polarization beam splitter/combiner (1703).

The first and the second polarization-state optical signal groups are reflected by the first and the second polarization reflector, the polarization direction rotates 90-degree respectively, propagating to the polarization beam splitter/combiner (1703) in reverse direction, reflecting and transmitting to the optical signal receiving unit group (1707) and be received. The optical signal receiving unit group (1707) is a coaxial packaging optical detector array with convergent lens array.

The optical signal transmitting unit group (1706) is made of the convergent lens array and the modulated laser array, the multi-channel's transmitting optical signals emitted from the modulated laser array have the single polarization-state, the wavelength can be the same or different, they pass through the convergent lens array, the first polarization reflector, the polarization beam splitter/combiner, then successively arrive at the input/output (1701) of optical waveguide array type.

To avoid the back reflection of the incident and transmitting optical signal, the end surface of the input/output (1701) of optical waveguide array type tilts a certain angle, the tilted angle is 6 to 8 degree.

What is claimed is:

1. A single-fiber bidirectional optical transceiver module, comprising:
   an input/output end, configured to input and output an optical signal;
   a polarization beam splitter/combiner, configured for polarization beam splitting and polarization beam combination;
   a first polarization reflector;
   a second polarization reflector;
   at least one optical signal transmitting unit; and
   an optical signal receiving unit;
   wherein
   at least one of the first polarization reflector and the second polarization reflector is formed by a 45-degree Faraday rotator and a sub-wavelength optical grating polarization reflector, the sub-wavelength optical grating polarization reflector may reflect an optical signal of a certain polarization state, and transmit an optical signal perpendicular to that polarization state;
   the input/output end receives an incident optical signal comprising at least one wavelength, and couples the received incident optical signal into the polarization beam splitter/combiner; the incident optical signal is disintegrated by the polarization beam splitter/combiner into a first polarization-state optical signal and a second polarization-state optical signal that are perpendicular to each other, which are respectively transmitted along a transmission path and a reflection path, and are reflected by the first polarization reflector and the second polarization reflector, polarization states respectively change into perpendicular polarization states, and are returned to the polarization beam splitter/combiner to be reflected and transmitted, so as to form two beams of the same direction to be spread to the optical signal receiving unit to be received; and
   an optical signal sent by the at least one optical signal transmitting unit is referred to as a transmitting optical signal, which comprises at least one wavelength, and has a single polarization state, wherein the arrangement of the polarization state of the transmitting optical signal enables the transmitting optical signal to be transmitted through the first or the second polarization reflector, and after transmittance, the polarization state is the same as the polarization state of the first polarization-state optical signal or the second polarization-state optical signal, and the transmitting optical signal is further transmitted or reflected by the polarization beam splitter/combiner to the input/output end;
   wherein the sub-wavelength optical grating polarization reflector is one of three optical gratings of a sub-wavelength dielectric, sub-wavelength metal, and a mixture of the sub-wavelength dielectric and the sub-wavelength metal, or may be obtained by forming one of the three optical gratings directly on an optical surface of the 45-degree Faraday rotator by using a micro fabrication process.

2. The single-fiber bidirectional optical transceiver module according to claim 1, characterized in that the location and the angle of the optical signal transmitting unit are arranged, so that after being transmitted through the first or the second polarization reflector, the transmitting optical signal has a location overlapped to the location of the first polarization-state optical signal or the second polarization-state optical signal, while directions are opposite.

3. The single-fiber bidirectional optical transceiver module according to claim 1, characterized in that, comprising two optical transmitting units, each optical transmitting unit comprises at least one wavelength; both the first and the second polarization reflectors are formed by a 45-degree Faraday rotator and a sub-wavelength optical grating polarization reflector.

4. The single-fiber bidirectional optical transceiver module according to claim 3, characterized in that the sub-wavelength optical grating polarization reflector is one of three optical gratings of sub-wavelength dielectric, sub-wavelength metal, and a mixture of the sub-wavelength dielectric and the sub-wavelength metal, or may be obtained by forming one of the three optical gratings directly on an optical surface of the 45-degree Faraday rotator by using a micro fabrication process.

5. The single-fiber bidirectional optical transceiver module according to claim 1, characterized in that the polarization beam splitter/combiner is a polarization beam splitter/combiner of a multi-layer dielectric optical thin film type.

6. The single-fiber bidirectional optical transceiver module according to claim 1, characterized in that the polarization beam splitter/combiner is a polarization splitter/combiner of a sub-wavelength optical grating type.

7. The single-fiber bidirectional optical transceiver module according to claim 1, characterized in that the first or the second polarization reflector is formed by a ¼ wave plate and a mirror.

8. The single-fiber bidirectional optical transceiver module according to claim 7, characterized in that the mirror is formed by plating an optical surface of the ¼ wave plate with one of a reflective metal film or a reflective multi-layer dielectric optical thin film.

9. The single-fiber bidirectional optical transceiver module according to claim 8, characterized in that the first or the second polarization reflector is formed by a 45-degree Faraday rotator and a mirror.

10. The single-fiber bidirectional optical transceiver module according to claim 9, characterized in that the mirror is formed by plating an optical surface of the 45-degree Faraday rotator with one of the reflective metal film or the reflective multi-layer dielectric optical thin film.

11. The single-fiber bidirectional optical transceiver module according to claim 1, characterized in that the input/output end is a pigtail and has an inclined end face.

12. The single-fiber bidirectional optical transceiver module according to claim 1, characterized in that, further comprising at least one collimating lens located between the input/output end and the polarization beam splitter/combiner, or between the polarization beam splitter/combiner and the optical signal receiving unit or the optical signal transmitting unit.

13. The single-fiber bidirectional optical transceiver module according to claim 1, characterized in that the optical transmit unit is an optical transmitter array, and the optical receiving unit is an optical detector array, and the input/output end is an optical waveguide array.

14. The single-fiber bidirectional optical transceiver module according to claim 13, characterized in that the front of the optical transmitter array further comprises an optical lens array, and the front of the optical detector array further comprises an optical lens array.

15. The single-fiber bidirectional optical transceiver module according to claim 1, characterized in that the optical transmit unit is formed by a wavelength multiplexer and an optical transmitter array; and the optical receiving unit is formed by a wavelength de-multiplexer and an optical detector array.

16. The single-fiber bidirectional optical transceiver module according to claim 1, characterized in that there is a wavelength multiplexer/de-multiplexer between the input/output end and the polarization beam splitter/combiner, the optical transmitting unit is an optical transmitter array, and the optical receiving unit is an optical detector array.

17. The single-fiber bidirectional optical transceiver module according to claim 16, characterized in that there is a collimating optical lens between the wavelength multiplexer/de-multiplexer and the polarization beam splitter/combiner.

18. The single-fiber bidirectional optical transceiver module according to claim 15, characterized in that the wavelength multiplexer or the wavelength de-multiplexer is one of an arrayed waveguide optical grating, a diffraction grating, a thin film filter group, or a cascading Mach-Zehnder interferometer.

19. The single-fiber bidirectional optical transceiver module according to claim 16, characterized in that the wavelength multiplexer/de-multiplexer is one of an arrayed waveguide optical grating, a diffraction grating, a thin film filter group, or a cascading Mach-Zehnder interferometer.

* * * * *